United States Patent
Moore

(10) Patent No.: US 6,774,208 B1
(45) Date of Patent: Aug. 10, 2004

(54) FRICTION HEAT, CRYOGENIC QUENCH SOLID STATE POLYMERIZATION

(75) Inventor: William P. Moore, Hopewell, VA (US)

(73) Assignee: Agri-Nutrients Technology Group, Inc., Disputanta, VA (US)

( * ) Notice: Subject to any disclaimer, the term of this patent is extended or adjusted under 35 U.S.C. 154(b) by 0 days.

(21) Appl. No.: 10/608,220

(22) Filed: Jun. 30, 2003

(51) Int. Cl.$^7$ .................................................. C08F 6/00
(52) U.S. Cl. ...................... 528/480; 521/182; 525/240; 525/285; 528/193; 528/194; 528/196; 528/198; 528/271; 528/272; 528/310; 528/323; 528/336; 528/339
(58) Field of Search .......................... 521/182; 528/193, 528/194, 196, 198, 271, 272, 310, 323, 336, 339, 240, 285, 480

(56) References Cited

U.S. PATENT DOCUMENTS 4,755,587 A * 7/1988 Rinehart .................... 526/272
5,750,644 A * 5/1998 Duh ............................ 528/481

* cited by examiner

Primary Examiner—Terressa Boykin

(57) ABSTRACT

A two step method for solid state polymerization of dry crystalline thermoplastic polymers to form polymers with superior mechanical properties, first by mechanically fluidizing dry crystalline thermoplastic polymer particles in the absence of oxygen by means of blades moving through the fluidized polymer particles at velocities sufficient to heat the particles to an incipient melt temperature and maintain the temperature until solid state polymerization provides the desired molecular weight and before chemical degradation of the polymer occurs; and second by immediately quenching by application of liquefied cryogenic gases directly to the surfaces of the polymer particles in amounts sufficient to cool the particles to temperatures lower than the glass transition temperature of the polymer before crystals in the polymer aggregate into large spherulites.

14 Claims, No Drawings

FRICTION HEAT, CRYOGENIC QUENCH SOLID STATE POLYMERIZATION

BACKGROUND OF THE INVENTION

1. Field of the Invention

The present invention relates to thermoplastic polymers and a method of polymerization of crystalline thermoplastic polymers to high molecular weight polymers in the solid state. More particularly, it relates to a method of rapid solid state polymerization under conditions of mechanically induced surface stress and friction heat applied to polymer particles at incipient melt point temperatures of the crystalline polymers, followed immediately by quenching the polymers by direct contact evaporative cooling with cryogenic liquids, such as nitrogen. The rapid high temperature solid state polymerization provides high molecular weight polymers with superior mechanical properties and the immediate direct quench minimizes chemical degradation of the polymers and growth of large crystal agglomerates, spherulites, which cause polymer brittleness and degrade other mechanical properties of polymers.

2. Description of Prior Art

It is well known that low molecular weight polymers, or prepolymers, may be polymerized with, or without, catalysts, in the solid state to produce high molecular weight polymers. These polymers usually exhibit increased hardness and increased intrinsic viscosities. The solid state polymerizations of the prior art have usually been done by heating resin particles for long periods of time at temperatures exceeding the glass transition temperatures but considerably lower than the resin melt temperatures.

During prolonged solid state heating polymer chains aggregate into supermolecular structures known as spherulites which are in some ways similar to grain structures in metals. Spherulites grow radially from a point of nucleation until other spherulites are encountered. Large spherulites cause brittleness and reduction in tensile strengths of polymers. The size of the spherulites can be controlled by the number of nuclei present with more crystalline nuclei resulting in more but smaller spherulites. Short heat times also result in smaller spherulites. The absence of large spherulites results in stronger less brittle polymers.

Duh in U.S. Pat. No. 5,750,644 provides a process for the crystallization and solid state polymerization of polyethylene naphthalate (PEN) at temperatures of about 20° C. above the glass transition temperature (Tg) and about 10° C. below the melting temperature (Tm) under special conditions for PEN only where pressure during the crystallization is higher than the vapor pressure of the volatile components in the PEN prepolymer. Duh states that the solid state polymerization time will normally range from 1 to 36 hours and preferably from 6 to 24 hours.

Duh in U.S. Pat. No. 6,403,762 disclosed a one step method of crystallizing and preheating polytrimethylene terephthalate (PTT) prepolymer without a drying/annealing step in between. The prepolymer still retains substantial moisture content when it is first exposed to the solid state polymerization temperature.

Ormand et al in U.S. Pat. No. 5,864,006 teach the preparation of high polymers of polycarbonates by heating a polycarbonate prepolymer with solvent and diluent, the prepolymer exhibiting a molecular weight of from 1,000 to about 20,000 under special conditions, at a temperature between about the prepolymer glass transition temperature less 50° C. and 350° C. A shearing force is applied at a rate of about 1 to 10,000 cycles per second. The shearing force is applied by a Haake Mixer or an extruder where the polycarbonate is melted.

Dujari et al in U.S. Pat. No. 5,955,569 disclose a method for solid phase polymerization of polyamide polymer using phosphorus catalysts in combination with an oxygen-free gas exhibiting very low Dew Points.

Solid state polymerization is made possible by an ability of a polymer to sustain a solid state at temperatures above the glass transition temperature without causing the polymer to fuse. When temperatures are held below the glass transition temperature polymerization cannot take place because the molecular movement is inhibited. Solid state polymerization takes place most rapidly at temperatures near to the melting temperature. It is difficult to operate at temperatures near to the melting temperature where heat is transferred into the polymer granules from external surfaces or gases without some of the particles reaching the melting temperature causing clumping and plugging of the solid state polymerization reactor.

In my U.S. Pat. No. 6,479,625B1 it was disclosed that the deformation of crystallizable thermoplastic polymer particles applied in a mechanically fluidized crystallizer creates heat of friction and mechanical stress on the particles to align the polymer molecules into crystallized polymers without agglomeration of the polymer.

Although the information provided in the foregoing references have advanced the art of polymerization of specific resins in the solid state, they have provided no solid state polymerization method applicable to thermoplastic resins which allows rapid and accurate polymerization to desired high intrinsic viscosities without formation of brittleness causing large spherulite crystals and chemical degradation of the polymeric chemicals.

OBJECTS OF THE INVENTION

It is therefore an object of this invention to provide a method of solid state thermoplastic polymer polymerization which provides rapid and accurate solid state polymerization to form mechanically superior polymers exhibiting high intrinsic viscosities without chemical degradation of the resin.

It is another object of this invention to provide a method of solid state polymerization wherein the friction between the polymer particles in a mechanically fluidized solid state polymerization reactor evenly generates heat sufficient to rapidly and evenly polymerize the polymers to the desired intrinsic viscosity.

It is a further object of the invention to provide a method which instantly stops the solid state polymerization reactions and the agglomeration of crystals to form large spherulites which cause polymer brittleness and reduce tensile strengths.

It is a still further object of the invention to provide a high strength thermoplastic polymer composition exhibiting high intrinsic viscosities which is free of large spherulites, produced by rapid solid state polymerization of crystallized polymer with heat created by friction between the resin particles in a mechanically fluidized polymerization reactor, with the particles of polymer instantly cooled to ambient temperature when the desired polymerization is achieved and before large spherulites are formed and chemical polymer degradation occurs.

SUMMARY OF THE INVENTION

I have now discovered that rapid solid state polymerization of crystalline thermoplastic polymers may be done effectively under conditions of mechanically induced surface stress and friction applied to polymer particles at incipient melt point temperatures of the crystalline polymers, followed immediately by quenching the polymers to temperatures below the glass transition temperatures of the polymers by direct contact evaporative cooling with cryogenic liquids. The new method of rapid high temperature solid state polymerization provides the preparation of high molecular weight polymers exhibiting high intrinsic viscosities, and superior mechanical properties and substantially eliminates chemical degradation of the polymers. The immediate direct quench by evaporating liquefied cryogenic gases directly on the polymer particle surfaces precludes the growth of large crystal agglomerates, spherulites, which cause polymer brittleness and degrade mechanical properties of the solid state polymerized polymers This discovery overcomes the limitations of the methods of the prior art and provides the objects of the invention with a practical method of solid state polymerization of crystalline thermoplastic polymers to form improved mechanical properties without chemical degradation.

DETAILED DESCRIPTION OF THE INVENTION

In the instant invention I have discovered that a two step method may be used for solid state polymerization of dry crystalline thermoplastic polymers to form polymers exhibiting superior mechanized properties and high intrinsic viscosities while substantially eliminating chemical degradation of the polymers. In this new method there are two definite steps in which the second step immediately follows the first.

In the first step crystalline thermoplastic polymer particles are mechanically fluidized in the absence of oxygen by means of blades moving around and through the fluidized polymer particles at velocities to provide surface contact and friction between the particles sufficient to heat the particles to the incipient melt temperature of the particles and to maintain that temperature until solid state polymerization occurs to provide the desired high intrinsic viscosity. The incipient melt temperatures of the polymers are temperatures at which the surfaces of the polymer particles start to become sticky before the mass of particles melts.

In the second step the polymer particles at the incipient melt point must be immediately quenched by application of liquefied cryogenic gases directly to the surfaces of the polymer particles in amounts sufficient to cool the particles to a temperature lower than the glass transition temperatures before the crystals in the polymer aggregate into large spherulites. The glass transition temperature is that temperature below which there is little movement of atoms on polymer chains and the polymer is glassy, and above which the polymer is rubbery with polymer chains of 40 to 50 atoms in length moving freely.

It is necessary to preclude oxygen from the solid state polymerization of the instant method because oxidation occurs at the elevated temperature causing chemical degradation of the polymers. Chemical degradation may also occur by thermal breakdown in the absence of oxygen when polymers are held at elevated temperature for long periods of time such as several hours.

Operation of the instant method must be done starting with crystalline thermoplastic polymers because the mechanical fluidization at the required temperature causes agglomeration and pluggage where atactic resins at incipient melt temperatures are used. A wide range of crystallinity may be used and satisfactory operation of the method achieved where crystalline polymers comprise between 10 and 75 percent crystals. It is difficult to achieve more than 75 percent crystals in ordinary polymer crystallizations.

A broad range of thermoplastic polymers may be used effectively in the instant method, although it is obviously necessary to use somewhat different solid state polymerization temperatures depending upon the incipient melting points of the crystalline polymers used. The crystalline thermoplastic polymers found to be effective in the instant method include polyesters, polyamides, polyurethanes, polyolefins, polycarbonates, polyphenylene sulfides, and their copolymers.

The mechanical fluidization of the instant invention may be performed in a variety of equipment so long as the requisite fluidization and energy input is supplied to the fluidizing blades. The method is performed effectively where the mechanical fluidizing is performed in a horizontal cylindrical solid state polymerization reactor in which the crystalline polymer particles are mechanically fluidized by a plurality of fluidizing blades moving around and in close proximity to the inner wall of the horizontal cylinder at speeds which cause friction between the particles, and between the fluidizing blades and the particles. The friction created provides heat and mechanical stress on the polymer particles by deforming them.

The method performs well where the fluidizing blades are operated at velocities sufficient to provide surface rubbing between the particles and friction therefrom to heat the particles to incipient melt temperatures of the polymers between 110 and 350° C.

The method is effective where the incipient melt temperatures are maintained for a period of time amounting to between 10 minutes and 2 hours until the solid state polymerization occurs to provide the desired high intrinsic viscosity in the polymer. There are several methods for determination of intrinsic viscosity and the method used is optional depending upon the polymer and the analytical equipment available.

A variety of equipment may be used to carry out the quench operation of the instant method so long as liquefied cryogenic gases are used and sufficient direct contact evaporative cooling is achieved. The method performs well where immediate quenching is performed in a quenching vessel comprising a horizontal cylinder rotating around its longitudinal axis with liquefied cryogenic gases sprayed directly onto the polymer particles rolling in the horizontal cylinder.

The method is effective where the immediate quenching of the polymer particles by application of liquefied cryogenic gases directly to the surfaces of the polymer particles cool the solid state polymerized particles to a temperature lower than the glass transition temperature of the polymer in 5 minutes, or less, thereby preventing the aggregation of crystals to form large spherulites which cause polymer brittleness.

Liquid cryogenic gases which may be used effectively for the immediate quenching of the polymer particles in the instant method include nitrogen, carbon dioxide, and air.

In a particularly economic embodiment of the instant invention the cryogenic gases evaporated in quenching the polymer particles may be recovered and used to displace air during the mechanical fluidization of the crystalline thermoplastic polymer particles. For the embodiment cryogenic air obviously may not be used.

Although the instant method is not effective starting with atactic polymers, it is effective when the necessary crystalline thermoplastic polymers have been prepared by heating atactic thermoplastic polymers at temperatures exceeding the glass transition temperature until the polymers contain less than 0.05 percent water and between 10 and 75 percent crystals.

The two step instant method may be operated either batchwise or continuously if the hot solid state polymerized granules are immediately quenched. A preferred embodiment is where the two steps of the method are operated in a continuous manner with the crystalline thermoplastic polymer continuously charged to the solid state polymerization reactor and sent continuously therefrom for quenching by direct application of liquefied cryogenic gases in a horizontal quenching vessel comprising a horizontal cylinder rotating around its longitudinal axis and rolling the polymer particles along the inner wall of the cylinder.

MODE OF OPERATION OF THE INVENTION

Having described the basic concepts of the instant invention, reference is now made to the following examples which are provided to illustrate the effectiveness of the method of the instant invention and the utility of the product of the method.

EXAMPLE 1

This example demonstrates the two step method of solid state polymerization of dry crystalline thermoplastic polymer in practical commercial equipment.

The crystalline thermoplastic particles used in this example comprised polybutylene terephthalate (PBT) polymer particles with average diameters of about 1.6 mm and about 3.2 mm long. The crystal content of the PBT was measured by density to be 31 percent.

The mechanical fluidization was performed in a horizontal cylindrical drum 92 centimeters in diameter and 184 centimeters long, having a nominal volume of 1200 liters. This cylinder serving as the solid state polymerization reactor was equipped with a variable speed horizontal shaft along the longitudinal axis of the cylinder connected to and driving four fluidizing shovel blades moving along and within 5 to 10 millimeters of the inner perimeter wall of the cylinder to assure that the polymer particles are brought into vigorous rubbing contact with each other and with the blades with sufficient force to create mechanical stress and friction to provide the needed heat on the particles. The cylindrical solid state polymerization reactor was fitted with an inlet feed port at the top of one end and an adjustable discharge weir at the other end so that the retention of the polymer particles in the reactor could be controlled. The reactor was equipped with an internal baffle to minimize internal backmixing in the reactor. The weir was set so that the reactor retained about 400 liters of polymer pellets while it was operating in a continuous manner.

The solid state polymerization reactor was also equipped with two nozzles entering below the level of the polymer particles to inject nitrogen gas to preclude oxygen from the reactor.

The dry crystalline PBT particles were fed to the reactor at a rate of 300 liters per hour at a temperature of 118° C., and the variable speed fluidization blades were operated at a velocity to bring the temperature up to the incipient melt temperature of 198° C. where the particle surfaces started to become slightly sticky. The polymer products continuously discharged from the reactor showed an intrinsic viscosity of 0.83 dl/g.

The PBT particles were discharged from the weir of the solid state reactor into a quencher comprising an enclosed cylinder fitted with lift baffles rotating around its longitudinal axis so as to roll the polymer particles as they fell from the lift baffles. The diameter of the quencher was 50 cm and the length was 125 cm. It was operated at about 20 percent fill. Liquefied nitrogen was introduced directly into the rolling bed of polymer particles quickly cooling by evaporative as well as convection heat transfer so that the polymer particles discharged from the quencher at 40° C. were well below the glass transition temperature of polybutylene terephthalate.

Examination of the polymer granules discharged from the quencher showed a good ultimate tensile strength of 9100 psi, and an ultimate elongation of 175 percent indicating that no brittleness from large spherulites in the polymer occurred.

EXAMPLE 2

This example demonstrates that the instant method may be used with polyamides in practical equipment.

Using the same apparatus as that used in Example 1 nylon 6,6 polymer particles with diameters of about 1.6 mm and 3.2 mm length with a crystal concentration of 15 percent and a molecular weight of 10,500 were treated. The nylon particles were fed at a rate of 600 liters per hour through the solid state reactor with the weir set so that the reactor retained about 450 liters while it was operating in a continuous manner. The fluidizing blades were operated at speeds to increase the temperature of the nylon 6,6 particles from 101° C. entering temperature to a discharge temperature of 203° C. The nylon particles were slightly sticky when they were continuously discharged from the solid state reactor to the quencher with an intrinsic viscosity of 0.87. The quencher was operated at about 25 percent fill with liquid nitrogen introduced so that the nylon 6,6 particles were discharged from the quencher at 34° C., well below the glass transition temperature of nylon 6,6. Average retention times of the particles in the solid state polymerization reactor was 45 minutes and 5 minutes in the quencher.

Examination of the nylon 6,6 polyamide particles discharged from the quencher showed a molecular weight of 24,000, an ultimate tensile strength of 12,800 psi, and an ultimate elongation of 310 percent, indicating that no brittleness was caused from the growth of large spherulites during the solid state polymerization.

EXAMPLE 3

This example demonstrates that the instant invention substantially eliminates depolymerization and chemical degradation during the solid state polymerization of thermoplastic resins.

In the solid state polymerization operation of Example 1 the nitrogen gas passing from the solid state reactor as oxygen scavenger was passed through a cold trap at liquid nitrogen temperatures. The condensate recovered was a dark liquid amounting to only 0.06% of the weight of the polymer fed. The condensate contained traces of butanediol, unidentified aldehydes and organic acids, indicating substantial elimination of chemical degradation of the polymer.

The PBT of Example 1 was placed in a 5 cm diameter and 50 cm long glass tube fitted with an internal thermocouple. Using heated nitrogen gas having a dew point of −30° C., the PBT particles were heated until the internal thermocouple indicated 204° C. That temperature was held for 2 hours.

Part of the particles in the bed were fused and stuck to the wall of the tube. The nitrogen effluent gas from the tube was passed through a cold trap at liquid nitrogen temperatures. The condensate recovered was a dark liquid amounting to 2.7 percent of the original weight of the PBT. The condensate was found to contain butanediol, unidentified aldehydes, organic acids, PBT oligomers and water, indicating substantial degradation of the PBT in the fixed polymer bed.

I claim:

1. A two step method for solid state polymerization of dry crystalline thermoplastic polymers to form polymers exhibiting superior mechanical properties and high intrinsic viscosities, the method comprising:

(a) mechanically fluidizing dry crystalline thermoplastic polymer particles in the absence of oxygen by means of blades moving through fluidized polymer particles at velocities sufficient to provide surface contact and friction between the particles sufficient to heat the particles to an incipient melt temperature of the particles and to maintain the temperature until solid state polymerization occurs to provide a desired high intrinsic viscosity; and, (b) immediately quenching the polymer particles by application of liquefied cryogenic gases directly to surfaces of the polymer particles in amounts sufficient to cool the particles to a temperature lower than a glass transition temperature before crystals in the polymer particles aggregate into large spherulites.

2. The method of claim 1 wherein the crystalline polymers comprise between 10 and 75 percent crystals.

3. The method of claim 1 wherein the crystalline thermoplastic polymers are selected from the group consisting of polyesters, polyamides, polyurethanes, polyolefins, polycarbonates, polyphenylene sulfides, and copolymers thereof.

4. The method of claim 1 wherein the mechanical fluidizing is performed in a horizontal cylindrical solid state polymerization reactor in which the crystalline polymer particles are mechanically fluidized by a plurality of fluidizing blades moving around, and in close proximity to the inner wall of the horizontal cylinder at speeds which cause friction between the particles and the fluidizing blades and between the particles, the friction providing heat and mechanical stress on the polymer particles by deforming them.

5. The method of claim 1, wherein the fluidizing blades are operated at velocities sufficient to provide surface rubbing between the particles and friction therefrom to heat the particles to incipient melt temperatures of the polymers between 110 and 350° C.

6. The method of claim 1 wherein the incipient melt temperatures are maintained for a period of time amounting to between 10 minutes and 2 hours until the solid state polymerization occurs to provide the desired high intrinsic viscosity in the polymer.

7. The method of claim 1 wherein immediate quenching is performed in a quenching vessel comprising a horizontal cylinder rotating around its longitudinal axis with liquefied cryogenic gases applied directly onto the polymer particles rolling in the horizontal cylinder.

8. The method of claim 1 wherein the immediate quenching of the polymer particles by application of liquefied cryogenic gases directly to the surfaces of the polymer particle cools the solid state polymerized particles to a temperature lower than the glass transition temperature of the polymer in 5 minutes or less, thereby preventing the aggregation of crystals to form large spherulites.

9. The method of claim 1 wherein the liquefied cryogenic gases are selected from the group consisting of nitrogen, carbon dioxide, and air.

10. The method of claim 1 wherein the cryogenic gases, except liquefied air, evaporated in the quenching on the polymer particles are recovered and used to displace the air during the mechanical fluidization of the crystalline thermoplastic polymer.

11. The method of claim 1 wherein the crystalline thermoplastic polymers are prepared by heating atactic thermoplastic polymers at temperatures exceeding the glass transition temperature until the polymers contain less than 0.05 percent water and between 10 and 75 percent crystals.

12. The method of claim 1 wherein the two steps of the method are operated in a continuous manner with the crystalline thermoplastic polymer continuously charged to the solid state polymerization reactor and sent continuously therefrom for quenching by direct application of liquefied cryogenic gases in a quenching vessel comprising a horizontal cylinder rotating around its center axis and rolling the polymer particles along the inner wall of the cylinder.

13. A continuous two-step method of solid state polymerization of dry crystalline polyester or polyamide polymers to form polymers exhibiting superior tensile strength, and high intrinsic viscosities, the method comprising:

(a) continuously charging in the absence of air dry crystalline polyester or polyamide polymer particles comprising between 35 and 60 percent crystals to a horizontal cylindrical solid state polymerization reactor in which the crystalline polyester or polyamide polymer particles are mechanically fluidized by a plurality of fluidizing blades moving around an in close proximity to the inner wall of the horizontal cylinder at speeds which cause friction between the particles providing heat and mechanical stress on the polyester or polyamide particles by deforming them, the heat being sufficient to heat the particles to incipient melt temperatures of the particles between 135 and 300° C., and to maintain the temperature for between 30 and 90 minutes until solid state polymerization occurs to provide the desired high intrinsic viscosities between 0.7 and 1.0 dl/g; and, (b) continuously discharging the solid state polymerized polyester or polyamide polymer particles from the polymerization reactor directly into a quenching vessel comprising a horizontal cylinder rotating around its center axis with liquefied nitrogen applied directly onto the polymer particles rolling in the horizontal cylinder to immediately cool the particles to a temperature lower than the glass transition temperature of the polyester or polyamide polymers, and continuously discharging the cool polyester or polyamide particles.

14. The method of claim 13 wherein a polymerization catalyst is included in the crystalline polyester or polyamide polymers to increase the rate of solid state polymerization.

\* \* \* \* \*